Figure 1:
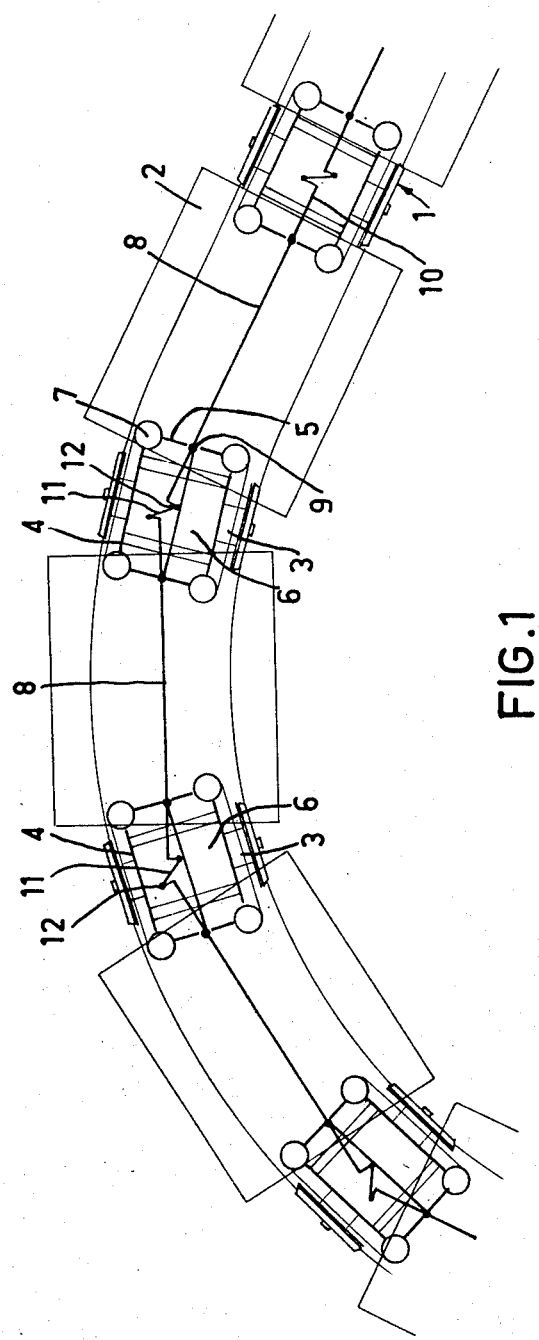

United States Patent [19]

Leriverend

[11] 4,235,451
[45] Nov. 25, 1980

[54] ARTICULATED AUTOMOTIVE VEHICLE

[75] Inventor: Jean-Paul M. Leriverend, Le Gradn-Quevilly, France

[73] Assignee: Ville De Rouen, France

[21] Appl. No.: 919,671

[22] Filed: Jun. 27, 1978

[51] Int. Cl.³ .............................................. B10D 7/00
[52] U.S. Cl. .................................... 280/408; 105/4 R
[58] Field of Search ................... 105/4, 199 S, 165, 3; 280/408, 410, 85

[56] References Cited

U.S. PATENT DOCUMENTS

| 1,645,983 | 10/1927 | Brinckerhoff | 105/4 R |
| 2,813,727 | 11/1957 | Whalen | 280/408 |
| 3,062,170 | 11/1962 | Verneaux | 280/408 |
| 3,740,076 | 6/1973 | Cupp | 280/408 |
| 4,127,202 | 11/1978 | Jennings | 280/408 |

Primary Examiner—Richard A. Bertsch
Attorney, Agent, or Firm—Holman & Stern

[57] ABSTRACT

An articulated automative vehicle, wherein the bodies with which it is formed sit on a gantry, or passageway, arranged between adjacent bodies above a single axle guided by said gantry, said bodies bearing on two pivots of the gantry cross beams and being articulated on the same connecting-rod at two points symmetrically located relative to the gantry center so that the axle always takes a position which is substantially along the bisectrix of the angle formed by the longitudinal axes of the two bodies it supports.

2 Claims, 3 Drawing Figures

ARTICULATED AUTOMOTIVE VEHICLE

The present invention relates to articulated automotive vehicles.

Generally, in the articulated automotive vehicles, that is those formed of a succession of bodies or cases connected to each other, particularly in the existing railroad vehicles, each body is placed either above simple axles fixed to the body or above bogies pivoting about fixed points of the body. As a result, the floor of such vehicles is necessarily rather high.

There exists also railroad vehicles in which the bogie supports the ends of two contiguous vehicles or bodies. In this type of vehicle, the bogie is of the double axle type and the bodies are articulated through a swivel element. The communication between bodies is provided by a gantry pivoting on said swivel which forms also the bogy center.

The orientation of the bogies in the curves does not depend of course on the relative position of the vehicles which they carry since it is caused by the rails. This type of articulation is therefore inapplicable to road vehicles.

The object of the invention is essentially to lower the floor of vehicles of such type and also follow rendering the wheels independent even when they are driving wheels, to position the axles perfectly in the curves and to reduce to the minimum possible the excess widths on the curves.

The vehicle according to the invention is characterized particularly in that the bodies forming the vehicle sit on a single axle arranged between adjacent bodies through a gantry forming a passageway arranged above said axle and on which the bodies are pivotally mounted respective to two pivots connected to said gantry, by being articulated on the same connecting-rod at two points symmetrically arranged relative to the center of the gantry.

The gantry is therefore linked to the two adjacent bodies through two distinct pivots and positioned by said bodies for instance by two braces of equal length attached to the bodies and connected to each other by the connecting-rod.

This device allows positioning the gantry and thereby the axle substantially along the bisectrix of the angle formed by the longitudinal axes of the two bodies it supports.

Due to such a structure, it is the bodies which position the axle and impart to it the ideal position in the curves.

The assembly formed by the bodies rigidly connected to the gantries by vertical pivots would form a non deformable beam in the horizontal plane if no flexibility was imparted at right angles to the gantries so that the vehicle may be adapted to the profile variations of the rails or of the road.

This flexibility is provided by a wide flexible horizontal plate, made in principle of steel.

Figure 2:
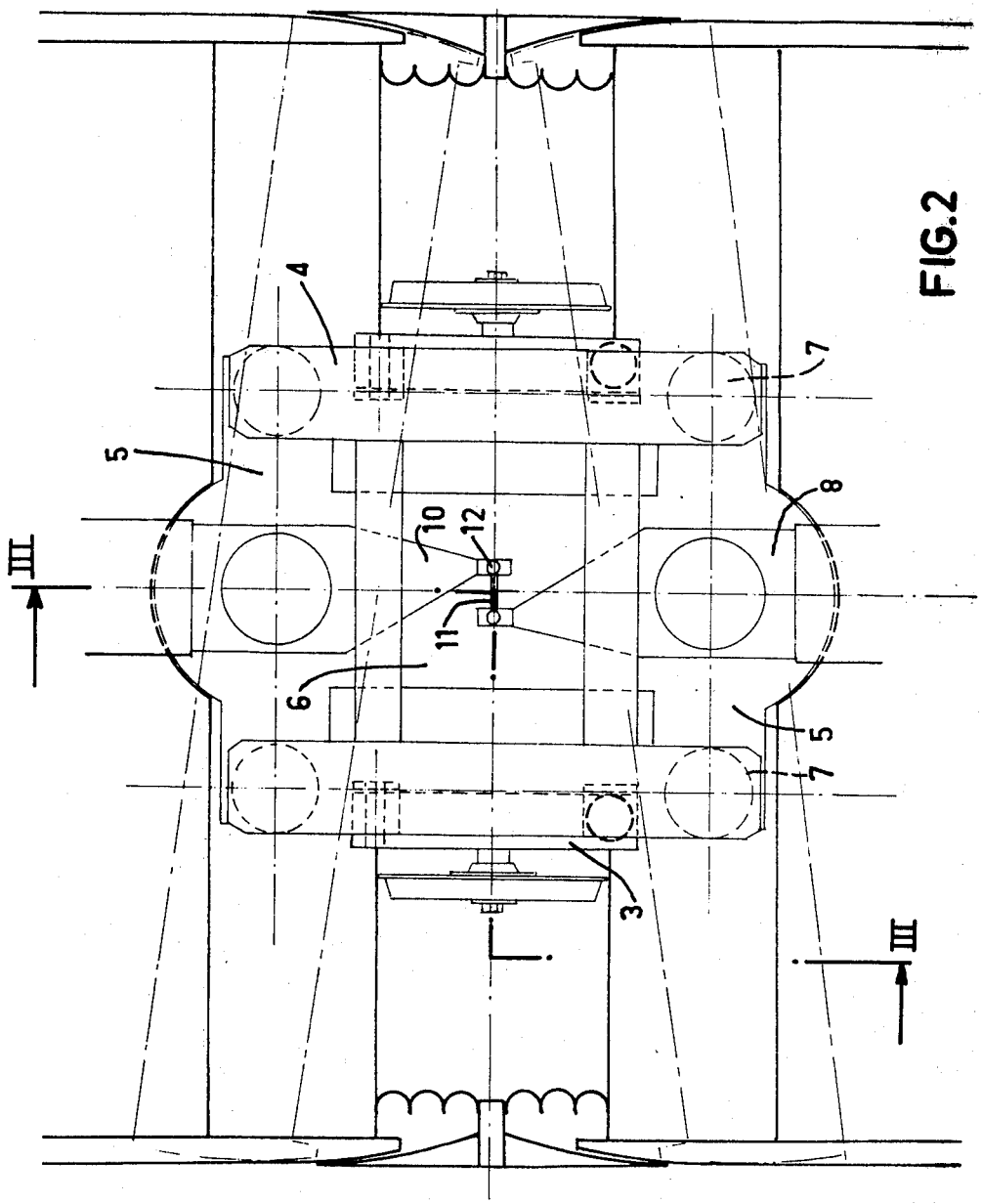
Figure 3:
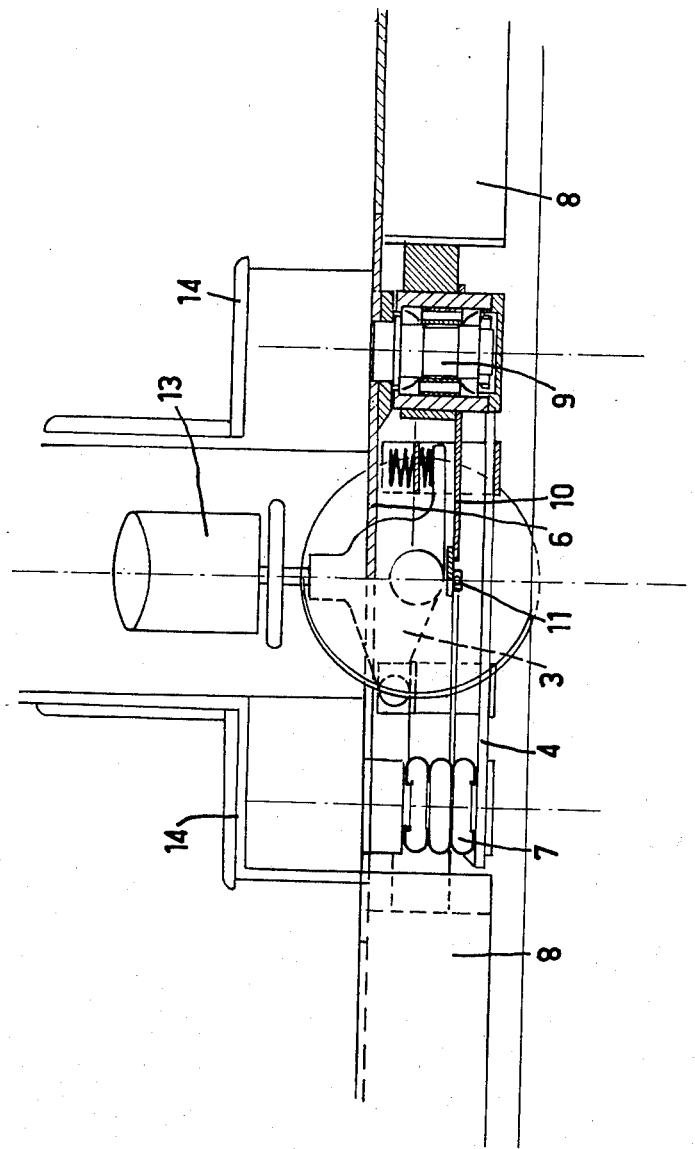

The accompanying drawing shows an embodiment of the vehicle according to the invention which is by no means limitative, drawing wherein:

FIG. 1 is a plan diagrammatic view of the vehicle according to the invention, in a curve, FIG. 2 is a plan view from below of a gantry and of the axle mounted between two adjacent bodies of the vehicle, and FIG. 3 is a cross-section along line III-III of FIG. 2.

In the example shown, the gantry 1 is situated between two bodies 2. Each gantry, or connecting passageway, sits on an axle 3 and guides the latter by means of longitudinal girders 4 and cross beams 5 through a suspension 7. The cross beams 5 are rigid with a steel plate 6. This plate 6 limits, due to its stiffness, the rotation or the unevenness of the cross beams 5. It catches up the various stresses due in particular to the dissymmetrical loads, the cants, the longitudinal section, the traction and the braking and keeps the two cross beams 5 "strictly parallel". It provides thereby the longitudinal stability of the vehicle.

The bodies 2 situated between two gantries 1 comprise a rigid longitudinal beam 8 and sit, through said beam, on each of their ends on one of the cross beams 5 of each of the adjacent gantries, by means of the pivot 9 which only authorize freedom of rotation in the horizontal plane.

Each beam 8 is continued at each end by an arm or "brace" 10 and a short connecting-rod 11 which connects the ends 12 of the two braces 10 which are facing each other of two adjacent bodies, by being articulated to said ends.

Said ends 12 are, when the track is straight, substantially symmetrically disposed relative to the center of the axle. In a curve, the axle positions itself substantially along the bisectrix of the angle formed by the longitudinal beams of the adjacent bodies.

Said connecting-rod 11 positions therefore the gantry and stabilizes it transversely relative to the bodies, the axle axis taking its position according to the radius of the curve followed by the bodies. The length of the braces and the positioning of the axle are a function of the respective lengths of the two adjacent bodies.

When the wheels of the axle are independent, the motorization may be provided by motors 13 connected to each wheel.

As is seen in FIG. 3, the motors 13 are located between two seats 14 back to back of two adjacent bodies, at right angles to the articulation; said seats move above the wheels in the curves of small radius.

The structure just described allows lowering the floor of the bodies by displacing the axles at right angles to the articulation and placing them under the seats back to back of two adjacent bodies and providing a central circulation for the passengers between the bodies which are at a constant level, above the axle.

Of course, the details shown are given only by way of example. For instance, the axles may be broken, only bearing, and the wheels non independent.

The device described may be used for any railroad or road equipments for transporting passengers.

What is claimed is:

1. An articulated automotive vehicle, wherein the bodies with which it is formed sit on a gantry arranged between adjacent bodies above a single axle guided by said gantry, said bodies bearing on two pivots of the gantry cross beams and being articulated on the same connecting-rod at two points symmetrically located relative to the gantry center so that the axle always takes a position which is substantially along the bisectrix of the angle formed by the longitudinal axes of the two bodies it supports.

2. The vehicle according to claim 1, wherein the axle carries the gantry by means of two cross beams connected by a wide horizontal plate, made primarily of steel, which limits, due to its stiffness, the deformation of said gantry and keeps the cross beams "strictly parallel".

* * * * *